United States Patent [19]

Noorily

[11] 3,952,373
[45] Apr. 27, 1976

[54] CABLE BUNDLING STRAP
[75] Inventor: Peter Noorily, Holliswood, Queens, N.Y.
[73] Assignee: Thomas & Betts Corporation, Elizabeth, N.J.
[22] Filed: Sept. 27, 1974
[21] Appl. No.: 509,919

[52] U.S. Cl. .............................................. 24/16 PB
[51] Int. Cl.² ....................................... B65D 63/00
[58] Field of Search ............................... 24/16 PB

[56] References Cited
UNITED STATES PATENTS

| | | | |
|---|---|---|---|
| 3,009,220 | 11/1961 | Fein | 24/16 PB |
| 3,102,311 | 9/1963 | Martin et al. | 24/16 PB |
| 3,484,905 | 12/1969 | Eberhardt | 24/16 PB |
| 3,590,442 | 7/1961 | Geisinger | 24/16 PB |
| 3,605,199 | 9/1971 | Eberhart | 24/16 PB |
| 3,672,003 | 6/1972 | Morgan | 24/165 B |

FOREIGN PATENTS OR APPLICATIONS

| | | | |
|---|---|---|---|
| 1,144,979 | 3/1963 | Germany | 24/16 PB |

*Primary Examiner*—Paul R. Gilliam
*Assistant Examiner*—Andrew M. Calvert
*Attorney, Agent, or Firm*—David Teschner; Jesse Woldman

[57] ABSTRACT

The invention is directed to a unitary bundling strap having a head end portion and a tail end portion and an elongated strap body portion therebetween. The strap body portion is fabricated with a plurality of teeth extending within the surface thereof and the head end portion is provided with an aperture to permit the strap to be transversely passed therethrough as the strap is drawn about a plurality of articles to be bundled. A selective portion of the head end portion is permitted to rotate in a first direction to permit the passage of the toothed portion of the strap body portion through the head end portion aperture and by the rotation of the head end portion a second opposite direction, as by the attempted withdrawal of the strap or by the tension applied by the bundle about which the strap is placed or the natural tendency of the head end portion due to its design the strap is brought into locking engagement. The head end portion is specially constructed so that generally the portion of the head end portion above the base of the transverse head end portion aperture is able to rotate as a single unit during the passage of the strap through the aperture in the tightening mode then rotate oppositely into a locking mode with the application of forces to the strap in a reverse direction.

4 Claims, 12 Drawing Figures

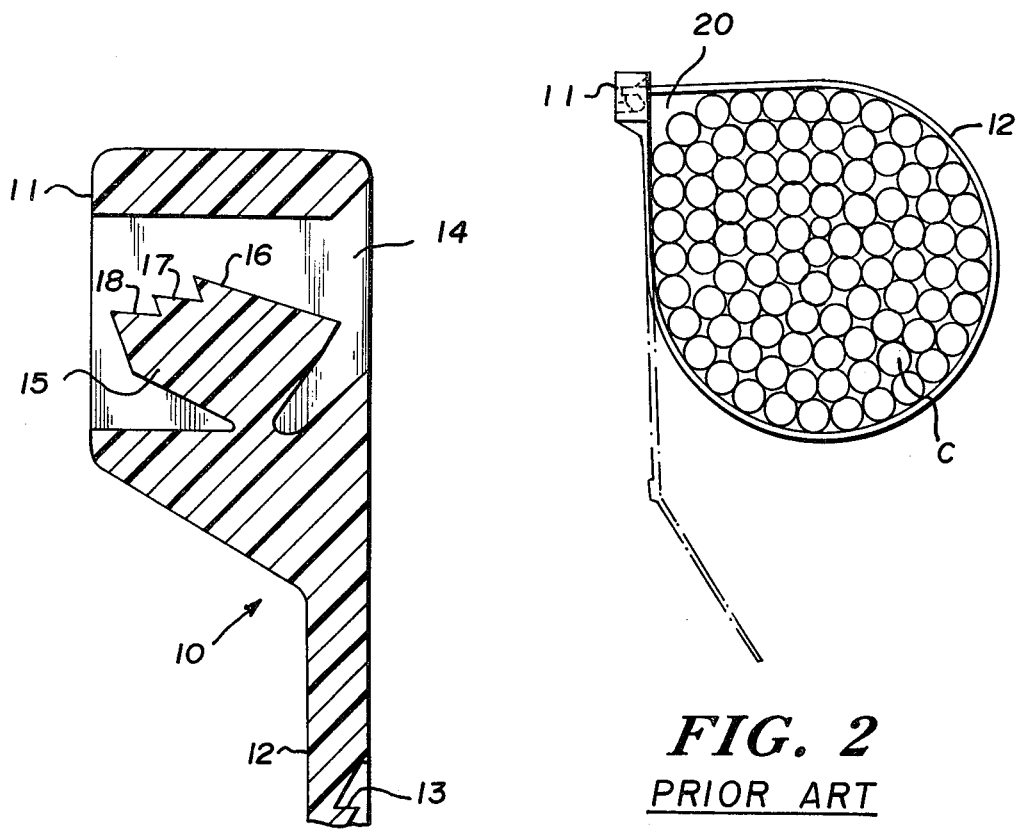
FIG. 1 PRIOR ART
FIG. 2 PRIOR ART
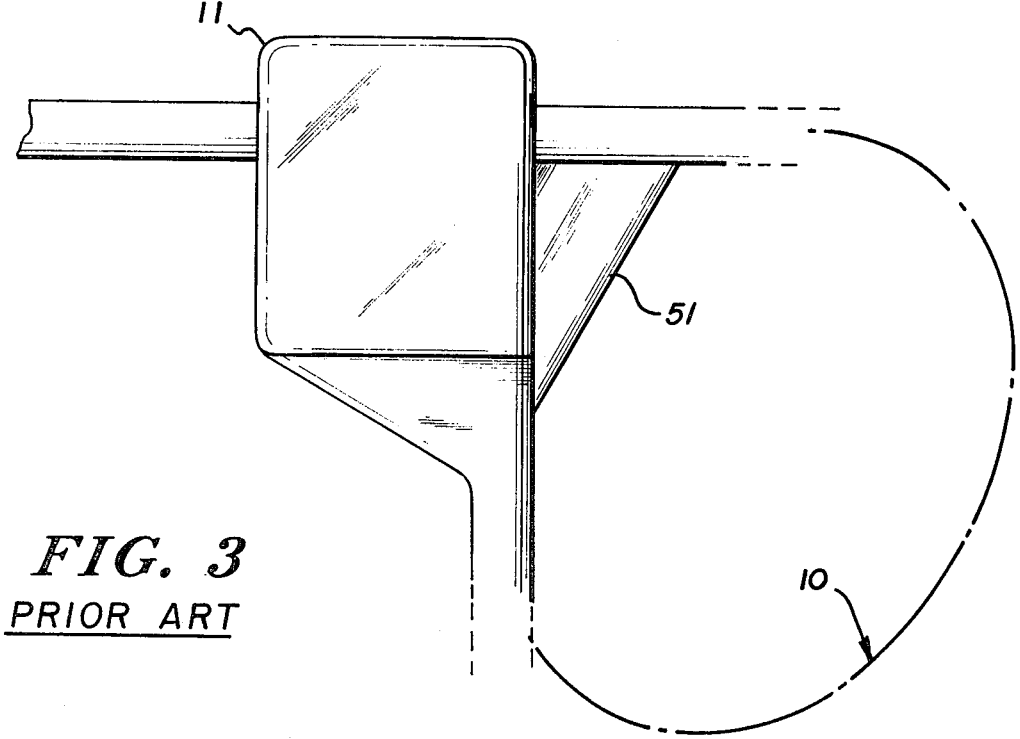
FIG. 3 PRIOR ART

CABLE BUNDLING STRAP

BACKGROUND OF THE INVENTION

1. Field of the Invention

The invention is directed to the field of bundling discrete articles into bundles of such articles and, for example, particularly deal with the bundling of individual wires or conductors into a cable or the like.

2. Description of the Prior Art

In prior art cable bundling straps two general types of locking means may be found. In a first, a metallic tongue or barb is inserted into the floor, ceiling, or sidewalls of a transverse aperture extending through the head end portion to engage or bite into the material of the strap when an attempt to withdraw the strap body portion is made after same has been looped around a plurality of articles to be bundled and placed through the aperture within the head end portion of the strap. In a second type of the prior art locking means, the strap body portion is formed with a plurality of teeth thereon or therein and a molded pawl having one or more teeth on a surface thereof is placed within the aperture of the head end portion in such a manner as to be deflected when the strap body portion is introduced during the tightening operation and which is forced into position to engage the teeth of the strap body portion when an attempt is made to withdraw the strap body portion from the head end portion aperture. In both of these approaches, it is necessary for the strap body portion to enter the head end portion of the strap normal to the plane of the rear surface of the head end portion, to permit proper engagement between the metallic tongue or barb and the strap body portion or the flexible pawl and the teeth within the strap body portion. This produces a rather cumbersome arrangement, with the head end portion protruding beyond the bundle diameter. The protrusion of the head end portion is particularly apparent with small cable bundles. Such extending portions may result in injury to the operator handling such bundles, restrict their passage through or admission into conduit, or injure the insulation of adjacent cables.

SUMMARY OF THE INVENTION

The present invention provides a unique bundling strap which employs another principle of locking different than those found in the prior art, that is, it makes use of a wedging action between respective portions of that head end portion for locking. Particularly in the novel strap disclosure herein, the head end portion, which has a transversely placed aperture extending therethrough, is divided by such aperture into two functional portions, the lower portion extending from the floor of the head end portion transverse aperture downwardly to the point where the head end portion is coupled to the strap body portion. The strap body portion which terminates in a thinned tail end portion has a plurality of teeth formed therein extending from a first surface of the body portion towards a second parallel spaced apart surface but terminating short thereof in a third surface. The distance between the second and third surfaces of the strap body portion will define a first thickness important in locking the strap as will be described below. The second portion of the head end portion exists above the floor of the transverse aperture extending within the head end portion and incorporates the sidewalls flanking the aperture, the ceiling, the portion extending above the aperture and the restraining means coupled to the ceiling and extending within the aperture itself towards the floor thereof. The spacing between the free end of the restraining means and the floor of the transverse aperture provides a second distance smaller than the first distance, that is, the distance between the second and third surfaces of the strap body portion. The placement of stiffening ribs on selected section sidewalls and the restraining means portion of the head end portion permits the second to pivot together as a unit about a line extending approximately along the ceiling of the transverse aperture upon the introduction of the tail end portion of the strap body portion into the aperture of the head end portion. The inclined leading edge of the teeth within the strap body portion when engaged by the free end of the restraining means will cause the second portion of the head end portion to deflect away from the strap body portion so as to admit the strap therebetween; that is, between the floor of the aperture and the free end of the restraining means. Such deflection will continue until such time as the tension within the bundle has reached the desired level, at which time further pulling upon the strap is discontinued. The tension placed in the bundle will have a retrogressive effect upon the strap body portion, attempting to pull the strap body portion from the head end portion aperture and relax some of the tension build-up within the bundle. This will cause the trailing edge of the teeth normal to the first surface of the strap body portion to engage with the free end of the restraining means causing same to be deflected in a direction towards the strap body portion and thus wedging it securely between the free end of the restraining means and the floor of the transverse aperture of the head end portion. Regardless of the tension in the bundle, but due to the presence of the various stiffening devices on the upper portion of the head end portion the strap will naturally be pulled in such a direction as to attempt to place the entire head end portion in its normal planar relationship and having the same effect as a full tension in the bundle. This reverse force is also produced by attempts to withdraw the strap body portion for the level end portion. The position occupied by the head end portion thus causes the overall strap to lie close to the bundle providing a very small projection beyond the outside dimensions of the bundle thus formed. It is therefore an object of this invention to provide an improved form of cable bundling strap.

It is another object of this invention to provide an improved form of cable bundling strap which does not require a deflectable restraining member.

It is yet another object of this invention to provide an improved form of cable bundling strap which is capable of conforming closely to the outer dimensions of the conductors to be bundled.

It is yet another object of this invention to provide an improved form of cable bundling strap which can be fabricated in a unitary manner.

It is yet another object of this invention to provide an improved form of cable bundling strap which because of its own geometry will rotate during tightening operation and upon the release of tightening forces will cause the strap to relax to a normal locked condition.

Other objects and features of the invention will be pointed out in the following description and claims and illustrated in the accompany drawings, which disclose, by way of example, the principles of the invention and the best mode which has been contemplated for carrying it out.

BRIEF DESCRIPTION OF THE DRAWINGS

In the drawings in which similar elements are given similar reference characters.

FIG. 1 is a fragmentary side elevation, in section, of a bundling strap constructed in accordance with one form of the prior art.

FIG. 2 is a side elevational view showing the bundling strap of FIG. 1 installed about a plurality of conductors and further showing, in phantom line, the position of the bundling strap prior to its installation about a plurality of conductors.

FIG. 3 is a fragmentary side elevational view of yet another cable bundling strap constructed in accordance with the concepts of the prior art and formed into a loop as it would be about a plurality of conductors.

DESCRIPTION OF THE PREFERRED EMBODIMENTS

Figure 4:
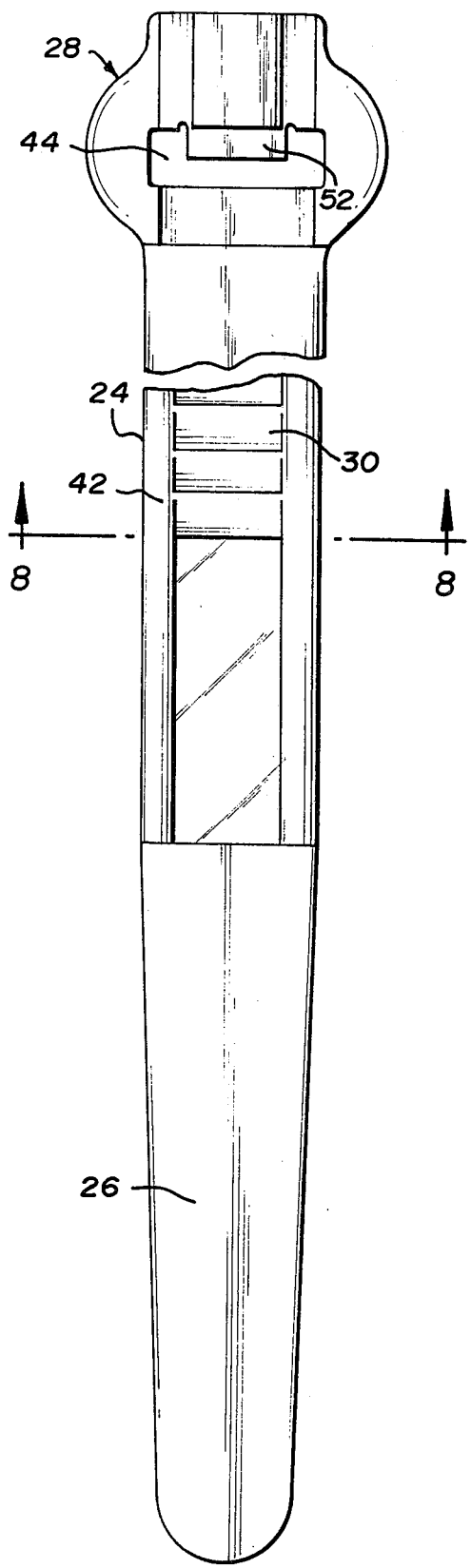
FIG. 4 is a top plan view of a cable bundling strap constructed in accordance with the concepts of the invention, shown foreshortened.

Turning now to FIGS. 1, 2, and 3 certain details of prior art devices may be appreciated. FIG. 1 which corresponds to FIG. 3 of U.S. Pat. No. 3,588,962 issued June 29, 1971, to L. H. Feldberg entitled "Bundling Strap" shows a strap 10 of the type having a molded pawl 15 terminating in a plurality of teeth 16, 17, 18 which will engage teeth 13 found in the body 12 of the bundling strap. The strap body 12 is looped about a plurality of articles, such as the conductors C as in FIG. 2, which corresponds with FIG. 2 of the same Feldberg patent, and then passed into the slot 14 of the head member 11 so as to permit the engagement between the teeth 16, 17, 18 of the pawl 15 with the teeth 13 formed within the strap body portion 12. As is shown in FIG. 2, the strap body portion 12 enters the head end portion 11 normal to the plane of the back surface of the head end portion 11 resulting in a space 20 between the conductors C and the juncture between the head member 11 and the strap body portion 12. In an effect to correct for this particular effect, the strap of the type shown in FIG. 3, which corresponds with FIG. 2, of U.S. Pat. No. 3,484,905 issued Dec. 23, 1969 to R. Eberhardt entitled "Bundle Tie", provides a triangular projection or gusset 51 in the back portion of the head member 11 so as to compensate for the void found in the illustration of FIG. 2. The result of this gusset 51 is to increase the overall size of the head end portion and thus increase the projection out from a cable bundle, particularly as the bundle size decreases.

Figure 7:
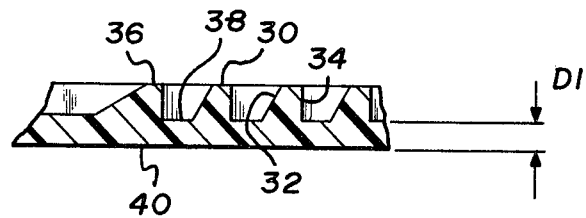
FIG. 7 is a fragmentary, elevational view, in section, of a portion of the strap body portion of the strap of FIG. 4.
Figure 8:
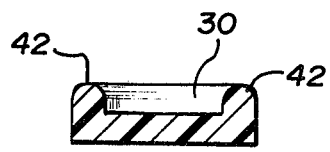
FIG. 8 is a front elevational view of the body portion of the strap of FIG. 4 taken along the line 8—8.

Turning now to FIGS. 4 through 8, the details of a bundling strap 22 constructed in accordance with the concepts of the invention can be better appreciated. The bundling strap 22 is constructed of a strap body portion 24 extending between a tail end portion 26 and a head end portion 28. Placed within the strap body portion 24 are a plurality of teeth 30 (see FIG. 7) each having an inclined leading edge 32 and a trailing edge 34 normal to surface 36. Coupling the inclined leading edges 32 and the normal trailing edges 34 of the same tooth 30 is an upper or top surface 36 which together define the top surface of the cable strap body portion 24. Further, a flat portion 38 exists between the trailing edge 34 and the inclined leading edge 32 of the following tooth 30. These flat portions 38 define a further or third surface, spaced apart from a second or bottom surface 40 by a distance equal to D1. To provide for maximum strength of a strap body portion 24, in that the forming of the teeth 30 result in material being removed from the upper surface 36, a pair of strengthening ribs 42, as best seen in FIG. 8, are positioned flanking the teeth 30 and extending substantially from the tail end portion 26 full length of the strap body portion 24 and terminating prior to the head end portion 28. The tail end portion 26 is rounded at the leading edge thereof and is made somewhat thinner than the remaining portion of the strap body portion 24 in order that the tail end portion may be easily grasped and threaded through the aperture within the head end portion (to be described below) without engaging the restraining means as will be described below.

Figure 5:
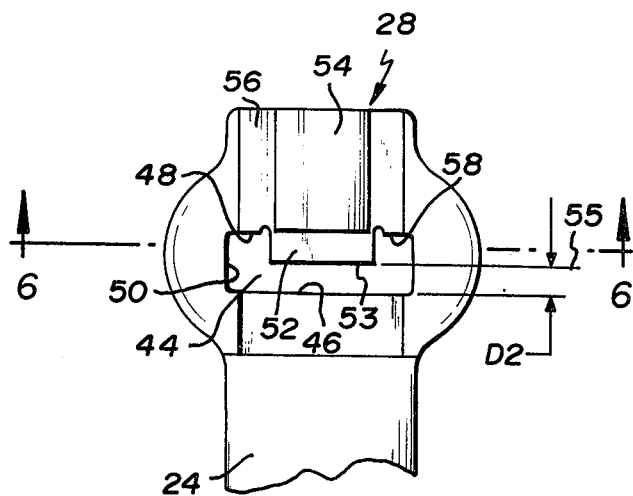
FIG. 5 is a fragmentary top plan view of the head end portion of the strap of FIG. 4 showing the details of such head end portion.
Figure 6:
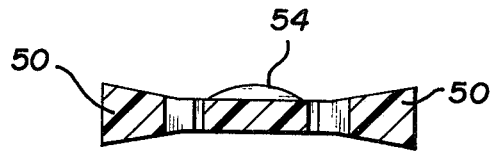
FIG. 6 is a front elevational view of the head end portion of FIG. 5 taken along the line 6—6.
Figure 9:
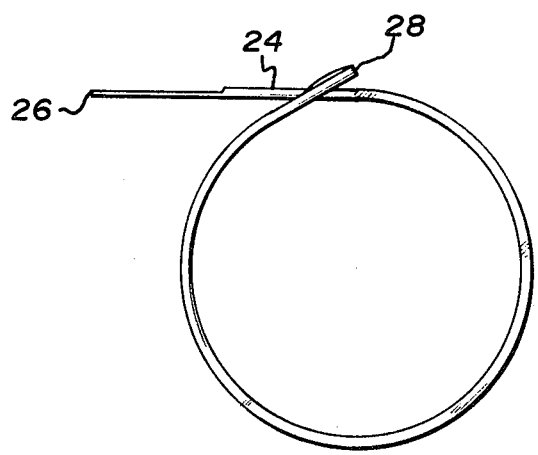
FIG. 9 is a side elevational view of the strap of FIG. 4 in a loosed looped condition.

Turning now to FIG. 5, the details of the head end portion 28 will be better appreciated. Extending transversely through the head end portion 28 is an aperture 44. The surfaces adjacent the aperture 44 are identified as follows: the surface adjacent the aperture 44 and closest to the strap body portion 24 is deformed as the surface opposite and spaced apart from the floor 46; is defined as the ceiling 48; two remaining surfaces defining the aperture 44 are the sidewalls designated as 50. Although defined in terms of the surfaces defining aperture 44, the surfaces used herein shall include the portions of head end portion 28 which terminate in the named surface. As is better seen in FIG. 6, sidewalls 50 have a heavier cross section than the remaining parts of the head end portion 28 to provide a generally stiffening action to facilitate the pivoting as will be described below. The restraining member 52 extends from the ceiling 48 in a direction towards the floor 46 of the transverse aperture 44. Formed atop the restraining means 52 is a strengthening rib 54, as will be best appreciated from FIG. 6. Intermediate the strengthening rib 54, build-up sidewalls 50, are sections of normal thickness 56. The spacing between the floor 46 and the free end 53 of the restraining member 52 is chosen to be a distance D2, where the distance D2 is equal to or less than the distance D1, which extends between the surfaces 38 and 40 of the strap body portion 24, as is shown in FIG. 7. As a result, the intrusion of the strap portion 24 within the head end portion aperture 44, causes the leading edge 32 of tooth 30 to bear against the free end 53 of the restraining member 52 causing the entire upper or second portion of the head end portion 28 to pivot about an axis extending along the ceiling 48 of the transverse aperture 44. The position of the head end portion 28 as strap body portion 24 is being pulled up to tighten the loop is shown in FIG. 9. That is, the intrusion of the strap body portion 24 within the head end portion 28 in a direction outwardly from the surface of the paper in FIG. 5, similarly causes the portion of the head end portion above the axis along the ceiling 48, as well as the restraining member 52, designated the upper or second portion to pivot as a unit in a direction outwardly from the surface of the paper as well.

Figure 11:
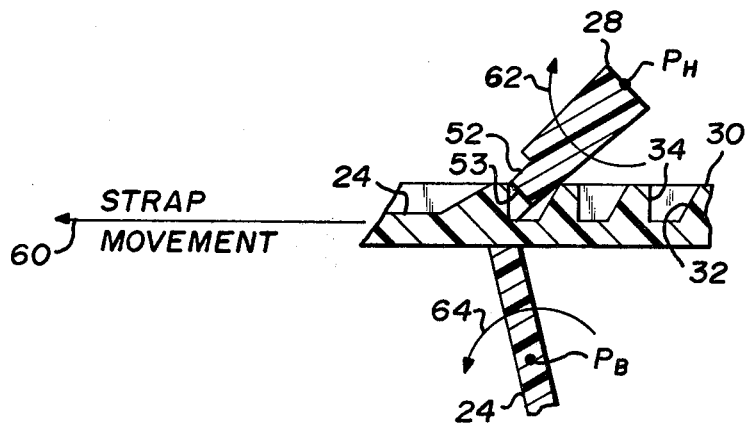
FIG. 11 is a fragmentary side elevational view in section, of the strap of FIG. 4 showing the positions of the various components as the strap body portion is moved in the tightening direction.

As can better be appreciated in FIG. 11, which is a fragmentary, side elevational view, in section, showing the effect of the intrusion of the strap body portion 24 into the aperture 44 within the head end portion 28 in the direction of the strap movement 24 as shown by the arrow 60 to the left of FIG. 11. Leading edge 32 of the first tooth 30 of the strap body portion 24 will engage the free end 53 of the restraining means 52 in the head end portion 28 and cause the entire upper or second portion of the head end portion to be deflected about a pivot point marked $P_H$ in a clockwise direction as indicated by the arrow 62. A slight movement of the lower or first portion of the head end portion 28, that is the portion below the axis extending along the ceiling 48 of the transverse aperture 44 of FIG. 5 in a counterclockwise direction as shown by the arrow 64 about a pivot point $P_B$ which exists somewhere within the strap body portion 24, also takes place. It should be recalled that the spacing D2, between the floor 46 and the free end 53 of restraining member 52, is less than the spacing D1, between surfaces 38 and 40 of the strap body portion 24, as a result, movement of the upper or second portion of the head end portion 28 is essential to increase the spacing between the floor 46 and the free end 53 of the restraining member 52 to be able to accommodate the thicker strap body portion 24 therebetween.

Figure 10:
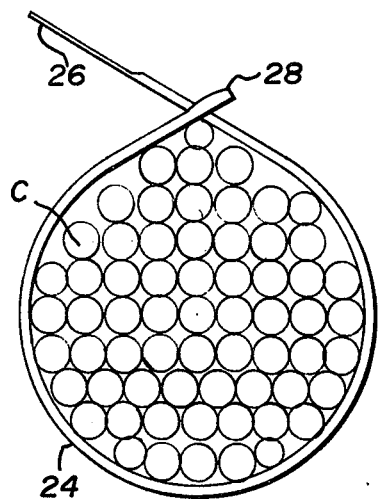
FIG. 10 is a side elevational view of the strap of FIG. 4 tightly looped about a plurality of conductors.
Figure 12:
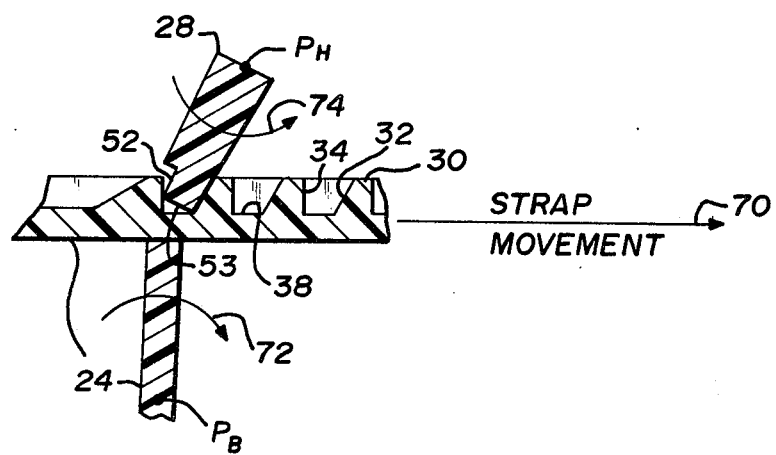
FIG. 12 is a fragmentary side elevational view, in section, showing the positions of the various components when under the influence of the force exerted by the bundle about which the strap has been placed or attempted withdrawal or the natural tendency of the strap due to its design.

As soon as the motion of the 24 in the direction of arrow 60 ceases, the bundle will attempt to expand from its contracted form towards its more relaxed initial condition causing the strap body portion 24 to move in a direction to the right of FIG. 12 as shown by the arrow 70. As a result, lower or first head end portion 28 attempts to rotate in a clockwise direction, as shown by arrow 72, about the pivot $P_B$ found somewhere within the strap body portion 24 and will cause the rotation of the upper or second head end portion 28 partially because of the contact of the free end 53 of the restraining member 52 with the surface 38 of the strap body portion 24 and partially because of the engagement between the restraining means 52 and the trailing edge 34 of the teeth 30. This will tend to move the upper or first head end portion above the axis extending along the ceiling 48 in a counterclockwise direction, as shown by the arrow 74, about the pivot point $P_H$. Relative movement of the upper or second portion of the head end portion 28, the lower or second head end portion 28 and strap body portion 24 will tend to wedge the head end portions into engagement with the strap body portion 24 intermediate two adjacent teeth 30, that is, contact with the surface 38 and will lock the strap 22 against further retrogressive movement. As a result of the position, the head end portion 28 takes as shown in FIG. 10 showing strap 22 tightly installed about a number of conductors C, a very small protrusion exists. The excess tail portion 26 will be severed.

It should be noted that because of the presence of the stiffening of the sidewalls 50 and the stiffening rib 54 on the head end portion 28 above the restraining member 52 and on the restraining member 52 itself, coupled with the areas of less thickness 56 there is a natural springing tendency in the upper or second portion of the head end portion 28 to return the upper or second portion of the head end portion 28 to its initial position whenever it is disturbed as by the insertion of the strap body portion 24. Natural resiliency and spring of the overall upper or severed portion moving as a unitary member will provide natural locking for the strap 22 even if the strap 22 is not tightly drawn about a plurality of articles such that the bundle itself can exert forces upon the looped strap as described above with respect to FIG. 12. Also any attempt to withdraw the strap body portion 24 from the head end portion 28 will similarly cause the locking mode of operation as described with respect to FIG. 12. The head end portion 28 also has recesses 58 to either side of the restraining member 52 to permit the passage of the strengthening ribs 42 of the strap body portion 24 through the aperture 44 without effect on the restraining member 52. Depending upon the material chosen and the strap thickness, the ribs 42 and also the recesses 58 can be omitted, if desired.

While there have been shown and pointed out the fundamental novel features of the invention as applied to the preferred embodiments, it will be understood that various omissions and subsitutions and changes of the form and details of the device illustrated and in their operation may be made by those skilled in the art, without departing from the spirit of the invention.

The embodiments of the invention in which an exclusive property or privilege is claimed are defined as follows:

1. A self-clinching bundling strap comprising: a head end portion, a tail end portion and an elongated strap body portion therebetween; said strap body portion having a first surface and a second surface and a plurality of teeth extending inwardly from said first surface towards said second surface and terminating short of said second surface to form a third surface, said third surface separated from said second surface by a first predetermined distance; said head end portion having an aperture extending transversely therethrough, the surfaces adjacent said head end portion aperture defining a ceiling, a floor and two side walls of said aperture; a rigid tongue portion rigidly coupled to said ceiling of said aperture and extending into said aperture towards said floor thereof, said tongue portion having a generally rectangular configuration in transverse section, the free end of said rigid tongue portion being separated from said floor of said aperture by a second predetermined distance, smaller than said first predetermined distance; and an elongate stiffening rib originating substantially at the juncture between said tongue portion and said ceiling of said aperture and extending along said head end portion away from said tongue portion and coaxial therewith, said stiffening rib having a width generally equal to the width of said tongue portion; stiffening means on each of said side walls to prevent the stretching of said head end portion; said stiffening rib and said stiffening means cooperating so as to cause said tongue portion and the head end portion above said ceiling to flex as a unit in a first direction about an axis extending along said ceiling of said head end portion aperture away from said strap body portion as said strap body portion is pulled through said head end portion aperture to tighten said strap about a plurality of articles to be bundled, said tongue portion being caused to flex in a second direction opposite said first direction about said axis as a unit with the head end portion above said ceiling towards said strap body portion when pulling on said strap body portion is terminated to lockingly engage said tongue portion with at least one of said teeth and a portion of said third surface therebetween and prevent removal of said strap body portion from said head end portion aperture.

2. A strap as defined in claim 1, wherein said strap body portion is bounded by first and a second generally parallel end surfaces; first and second strengthening ribs each adjacent its associated end surfaces and extending for a portion of said strap body portion length intermediate said head end portion and said tail end portion; said teeth extending between said first and second strengthening ribs along a portion of the length of said strengthening ribs.

3. A strap as defined in claim 2, further comprising: first and second recesses in said ceiling, each recess being adjacent one edge of said restraining means, said recesses each accepting its associated one of said first and second strengthening ribs as said strap body portion is pulled through said head end portion aperture.

4. A strap as defined in claim 1, wherein each of said teeth has an inclined leading face and a trailing face perpendicular to said first and second surfaces of said strap body portion and a flat portion intermediate said leading and trailing faces which is a portion of said first surface of said strap body portion.

* * * * *